United States Patent [19]
Cooper et al.

[11] Patent Number: 6,141,057
[45] Date of Patent: Oct. 31, 2000

[54] APPARATUS AND METHOD FOR MAINTAINING SYNCHRONIZATION OF MULTIPLE DELAYED SIGNALS OF DIFFERING TYPES

[75] Inventors: J. Carl Cooper, Monte Sereno; Howard Loveless, Ben Lomond; David Wallen, San Francisco; Mirko Vojnovic, Santa Clara, all of Calif.

[73] Assignee: Pixel Instruments Corp., Los Gatos, Calif.

[21] Appl. No.: 09/324,339

[22] Filed: Jun. 2, 1999

Related U.S. Application Data

[60] Division of application No. 08/573,468, Dec. 15, 1995, Pat. No. 5,946,049, which is a continuation-in-part of application No. 08/096,240, Jul. 26, 1993, Pat. No. 5,550,594.

[51] Int. Cl.[7] ................................................. H04N 9/475
[52] U.S. Cl. ........................... 348/515; 348/512; 348/572
[58] Field of Search ................................... 348/512, 513, 348/715, 514, 516, 517, 518, 584, 554, 572, 573, 536, 537, 538, 539, 540, 541, 542, 510, 716, 717, 423, 845.3; H04N 9/475

[56] References Cited

U.S. PATENT DOCUMENTS

| 5,550,594 | 8/1996 | Cooper et al. | 348/513 |
| 5,751,368 | 5/1998 | Cooper | 348/512 |
| 5,877,815 | 3/1999 | Tsujimura | 348/515 |
| 5,946,049 | 8/1999 | Cooper et al. | 348/513 |

*Primary Examiner*—Michael Lee
*Attorney, Agent, or Firm*—J. Carl Cooper

[57] ABSTRACT

This invention is a method and apparatus for synchronization high quality video like signals. The preferred embodiment is described to synchronize a plurality of mutually unsynchronized video signals as well as passing one or more associated secondary signal with each video signal with a corresponding delay. The selection of one of a plurality of reference signal candidates is shown along with the use of the input signal to provide a fixed delay.

66 Claims, 2 Drawing Sheets

APPARATUS AND METHOD FOR MAINTAINING SYNCHRONIZATION OF MULTIPLE DELAYED SIGNALS OF DIFFERING TYPES

This application is a divisional of application Ser. No. 08/573,468 filed Dec. 15, 1995, now U.S. Pat. No. 5,946,049 issued Aug. 31, 1999, which in turn is a Continuation in part of application Ser. No. 08/096,240 filed Jul. 26, 1993, now U.S. Pat. No. 5,550,594 issued Aug. 27, 1996, which application is incorporated by reference in its entirety as if it were fully set out therein.

BACKGROUND OF THE INVENTION

1. Field of the Invention

The present invention relates to the field of synchronizing asynchronous signals and finds particular use in synchronizing multiple video type signals in television systems.

2. Description of the Prior Art

The prior art contains many circuits for video synchronizers, beginning with U.S. Pat. No. 4,018,990. These synchronizers generally provide video synchronization by sampling and digitizing the active video portion of a video signal in response to the timing thereof, or in the case of digital video signals recovering the clock and digital samples therefrom, storing the digitized video in a memory. The digitized video is read from the memory at a proper time in response to a reference signal to achieve synchronization thereof. In some devices the digitized video is converted back to a more desirable form, digital or analog or both. Some devices reconstruct and combining the appropriate ones of sync, burst and blanking with the read video.

Video synchronizers for use with single video signals are commonplace in the industry, with multiple video signals being accommodated by use of multiple complete video synchronizers, each being fully self contained. Various techniques and circuits to perform these functions are well known in the art, and emphasis has been placed on improving performance in terms of minimizing noise and distortion from the digitizing process, and improving the immunity of the devices to noise or errors which may be carried with or interfere with the signal which is being synchronized.

SUMMARY OF THE INVENTION

The inventive video synchronizer and improvements described herein are designed to allow synchronization of high quality video like signals in analog or digital form (which may include compressed digital form such as MPEG, etc.), while providing minimum distortion and maximum transparency. The invention is particularly well suited for efficiently synchronizing multiple video type signals of mixed or matched form to a desired reference signal. It will be recognized that the inventive teachings herein may be applied equally to analog signals in analog component, composite, serial and parallel and digital data streams in digital serial, parallel, component, composite and compressed form, as well as other forms and standards of electronic signal conveyance.

Because full sync tip to peak white video may be digitized in the analog preferred embodiment shown herein, one would normally expect quantizing errors to be significant. The inventive features of the preferred analog embodiment however show the use of sophisticated digital signal processing techniques such as oversampling and interpolation, such that these errors are kept to unexpected low levels.

The inventive concepts described herein are applicable for many analog and digital video signal standards, including but not limited to MONOCHROME, SECAM, PAL, NTSC and HDTV versions in analog form, for example the well known RS-330 and RS-170 standards, as well as digital form, for example the well known SMPTE 259 and 260 standards or compressed digital form, for example JPEG, MPEG 1 and MPEG 2. Other functions may be combined with the synchronizing function, for example standards conversion, compression and decompression, noise reduction, oversampling and filtering. Such additional functions will be referred to herein and in the claims as filtering, and will be understood to include such additional functions.

In the preferred embodiment of the invention it is taught to store and pass one or more secondary signal with the video signal in fashion which maintains proper time relationship between the video signal and the secondary signal.

The inventive concepts described herein are well suited for use in synchronizing satellite, microwave and telephone feeds, inter-suite connections and in house signals, thus eliminating the use of expensive and cumbersome multiple genlocking and timing schemes.

OBJECTS OF THE INVENTION INCLUDE

An improved video synchronizer as described in application Ser. No. 08/096,240 incorporated herein by reference, A video synchronizer for multiple video signals of the same or different form for which the circuitry for each video signal may be separately constructed and which may be installed in various case configurations, with the common circuitry being shared by the multiple circuits.

A multiple electronic signal synchronizer configuration in which a single genlock circuit may be utilized to provide reference signals for multiple signal synchronizers, while retaining individual genlock phase controls for each output electronic signal.

A signal synchronizer in which one of the input signals is used as the reference.

A multiple electronic signal synchronizer which is configured to be used as an adjustable, fixed length delay, which use may be automatically switched.

A multiple signal synchronizer configured to use a selected one of the input signals as the reference to synchronize a plurality of input signals to one of the plurality, with the selection of the reference being automatically switched under known conditions.

A signal synchronizer capable of using recursive and nonrecursive adaptive filtering for noise reduction, image enhancement or other features.

A signal synchronizer capable of storing a full repetition period of the signal in memory. A video signal synchronizer capable of storing the entire video signal, including associated sync, timing, error checking and ancillary signals or portions so as to pass those signals or portions in addition to the active video portions.

A video synchronizer capable of selecting ones of the portions outside of the active video so that those portions may be preserved and passed or reconstructed and reinserted in the stored signals from the memory.

A video signal processing device having a memory for the video signal and having an additional memory capability for one or more related or unrelated secondary signals in order to achieve proper time relationship of the secondary signals with respect to the associated video signal.

These and other objects of the invention will become apparent to one skilled in the art from the description herein, taken in conjunction with the attached drawings.

DESCRIPTION OF THE PREFERRED EMBODIMENT

Figure 1:
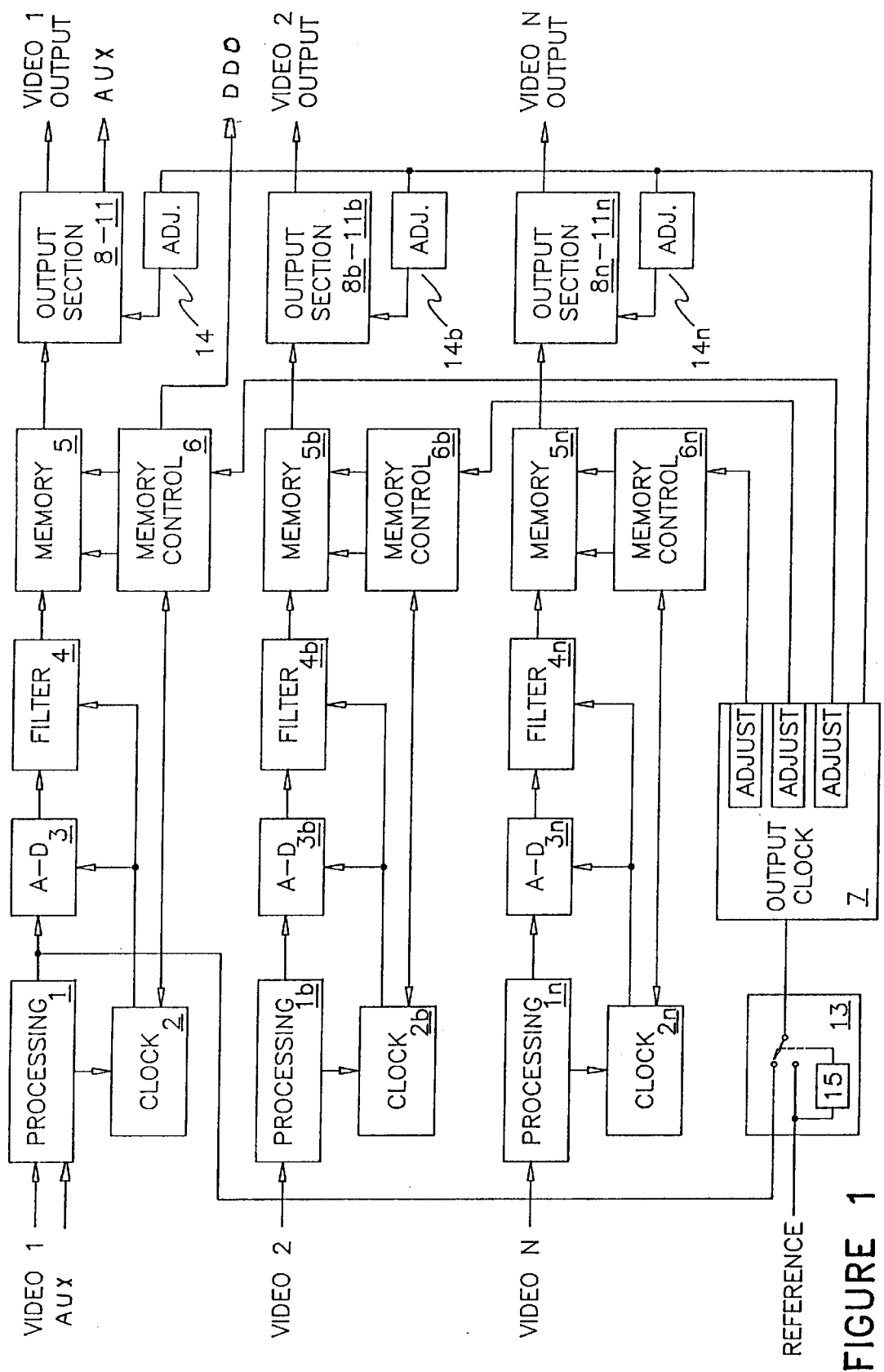
FIG. 1 is a block diagram of a multiple synchronizer system of the preferred embodiment of the invention as used with analog to digital convertors.

The preferred embodiment described herein is applicable for use with reference signals of a type similar to the commonly used black burst signal or component or composite digital signals. Alternatively, other signals may be utilized for reference, for example individual ones of clock, subcarrier, H and V sync and field one reference, or compressed digital signals such as MPEG or JPEG types, which signals may be utilized in respect to the multiple synchronizer configuration described herein.

In the preferred embodiment a multiple synchronizer configuration is used with the ability to install individual signal path circuit for each incoming electronic signal to be synchronized, with each of the individual signal path circuits being adapted to operate with the specific form of the signal. For example video signals such as analog, SMPTE 259, MPEG, JPEG, etc. and various associated signals such as analog and digital audio, time code, machine control as well as other related or unrelated secondary signals may all be synchronized by combining individual signal path circuits for each signal. In this fashion, a single case containing power supply and genlock, as well as desired ones of special effects, remote control and/or other common signal processing functions may be utilized. It will be appreciated that such a case will also be fitted with the desired number and combination of individual signal path circuits which carry the electronics which are necessary for and specific to the form or type of signal to be synchronized. In this fashion, multiple collections of signals of differing types may be conveniently accommodated and synchronized.

It will be understood that the phrases signal path and signal path circuits will refer to accommodating at least one signal, but may also refer to accommodating multiple signals, since circuits accommodating individual signals may be combined, with common elements, for example the memory and memory controller, being shared. For example, analog signal paths may be constructed together to allow multiple analog signals to be accommodated. Similarly digital signal paths may be combined. A digital program signal path may be constructed to accommodate a digital video signal and associated digital audio signals.

One of the novel features of the multiple synchronizer configuration taught herein is the ability to utilize a single genlock circuit to select the reference to which each of the multiple signals which are input to the synchronizer configuration are synchronized or timed. The genlock circuit is preferred to be capable of alternately selecting one of an external reference or the video signals to be synchronized for use. Such selection is preferred to be available as automatic or operator selectable, as desired by the operator. In the automatic operation, a hierarchy of selections may be specified, for example the operator might set the following criteria for selection:

highest priority, external digital reference
next priority, external analog reference
next priority, first video to be synchronized
next priority, second video to be synchronized Using this plan, if the external digital reference is present it is used, otherwise the analog reference is used if it is present, otherwise the first video to be synchronized is used if it is present, otherwise the second video is used. This feature of the invention may be utilized to accommodate any number of signals.

Unlike other synchronizers which switch to an independent internally generated reference in the event that an external reference signal is not supplied or is lost, the preferred embodiment of the present invention teaches a capability to automatically switch to use the input video signal as the reference. This novel feature allows the synchronizer to be used as an adjustable, fixed length delay, useful for a variety of timing and other purposes. It will be appreciated that this capability may be used in conjunction with an internal reference however. For example, if none of the desired external signals or inputs is present, then the internal reference may be selected.

In the preferred embodiment it is desired to retain individual phase controls for adjustment of the output phase of each synchronized signal with respect to the reference signal. Such individual control is very useful since it is a frequent requirement to synchronize several input signals to a common reference signal. The individual controls may be located with, or part of, the common genlock circuit, or with each signal path, for example on the memory control circuit.

With the widespread use of digital video processing, audio synchronization is becoming a significant problem. The preferred embodiment of the invention shows inventive concepts which incorporate a digital delay output (DDO) which provides a steering signal to drive a companion audio synchronizer such as those described in U.S. Pat. Nos. 4,313,135 and 5,202,761, thereby providing accurate audio to video synchronization.

The preferred embodiment described herein may be constructed with commonly available parts. Specific attention is called to the family of digital video ICs which are supplied by Gennum Corporation of Toronto, Canada. These ICs provide all of the capability to interface serial video data streams to standard parallel sample data streams, such as those which are provided by the analog to digital converters and digital to analog converters shown in the earlier application. Gennum also provides ICs for operation with parallel video interconnection and for reconstruction and replacement of various synchronizing and other components outside of the active video portion of a digital signal. It will be recognized by one of ordinary skill in the art that the A-D and D-A circuitry may be replaced with the serial to parallel and parallel to serial convertor circuits supplied by Gennum in order to utilize the present invention with digital video signals. Attention is also called to the family of analog and digital ICs manufactured by Crystal Semiconductor of Austin, Tex. Crystal's ICs provide all of the capability of interfacing analog and digital associated signal such as audio, time code, control and other secondary signals in the signal path of the present invention. For example, Crystal supplies ICs for interfacing AES/EBU digital audio signals commonly associated with video signal with the memory circuitry 5 of the preferred embodiment.

Attention is further called to the several digital compression and decompression ICs supplied by manufacturers such as C-Cube, LSI logic and Zoran of San Jose, Calif. which ICs may be incorporated to facilitate use of the invention with compressed digital video, audio and associated signals for example as that which are compressed in accordance with JPEG or MPEG standards.

FIG. 1 shows a block diagram of a multiple channel video synchronizer system having a plurality of video inputs 1-N coupled to individual signal paths. The invention operates to synchronize each of the video inputs to a common reference signal. Each signal path consists of elements 1, 2, 3, 4, 5, 6, and 8–11 shown by way of example and all corresponding to the same numbered elements of the previous application U.S. Pat. No. 5,550,594, which may be referred to for detailed description. Each video signal is received by a processing circuit 1 which operates to prepare the video signal for conversion to digital in an A-D convertor 3 commonly referred to in the art as an ADC. A clock generator 2, generates a sampling clock commonly referred to as the write clock, which is preferred to be related to the input video signal, which sampling clock is coupled to the A-D 3 and filter 4. In addition, the clock circuit 2 operates to provide appropriate control and timing signals to the memory control 6, as well as to receive appropriate control and timing signals therefrom.

The digital video output from the A-D 3 is coupled to a filter circuit 4 where various filtering operations may take place as previously described. Alternatively, the filter circuit 4 may be eliminated if no filtering is desired. While the filter circuit 4 is shown operating on the video input to memory 5, it will be understood that 4 may operate on the video output from memory 5 before it is coupled to the output section 8–11, or may operate on both video input and video output from memory. The nature of the filtering may be recursive or nonrecursive or both as desired to implement a particular filtering application.

In the preferred embodiment, the filtered video from 4 (or alternatively the unfiltered video from 3) is coupled to the memory 5 where it is stored in response to the memory control 6, in response to the input signal synchronizing type components. The stored video is read out of the memory 5 under control of the memory control 6 in response to a timing signal provided by the output clock circuit 7. The read out of the video signal is responsive to the reference signal as facilitated by the reference signal selector 13 and the output clock circuit 7 which provides the timing signal. The stored video read out of the memory 5 is in effect a delayed version of the input signal, and thus can be said to be a delayed input signal which is synchronized with the reference signal.

The stored video read out of the memory 5 is coupled to the output section 8–11 where the video is operated on as previously described, for example to select portions contained within the non picture areas corresponding to said stored signal from said memory 5 in order that these selected portions may be preserved or passed and further to operate so that known ones of the repetitive portions of the non picture areas corresponding to said stored signals from said memory section are reconstructed or reconstituted in said stored signals from said memory section before it is output. The signal which is output from the output section 8–11 is thus also a delayed signal synchronized with the reference, but it has had additional processing performed upon it. For example, the embedded audio and test signals which are contained in the nonpicture area of the video signal may be selected to be passed unaltered while the active video may be operated on to change the gain or offset of one or more of the components, and the synchronizing type signals may be reconstituted in the signal. Thus since the video signal is delayed and processed, the output of 8–11 is a delayed version of the input video signal which is synchronized to the reference.

As previously described, 14 provides for fine adjustment of the video signal timing, for example to achieve the desired color subcarrier phase. Alternatively, this function may be combined in the memory controller 6.

FIG. 1 also shows an auxiliary signal path associated with Video 1, which shares the Video 1 signal path electronics. The auxiliary signal may be an associated signal such as an audio signal, or other secondary signal as previously described. It is important to note that in this manner the auxiliary signal may be synchronized to the reference signal, or may otherwise be delayed in relation to the video 1 signal in order to maintain proper timing relationship therewith. In many instances, it is desirable to mute, modify or otherwise act on the auxilary signal if the associated video signal is disrupted. For example in MPEG or other compressed data streams, the digital audio is likely to be corrupted if the digital video is disrupted. In this instance the output section 8–11 will be preferred to operate to provide such muteing or other action on said auxiliary signal in response to the detection of the disruption by 2 or alternatively response to the outputting of a frozen image by the memory 5.

FIG. 1 shows a common reference selector 13 which contains a reference detector 15 which operates to detect the presence of a given preferred reference signal, shown here by example as the external reference. If the preferred reference is present the selector 13 selects it to be used as the reference for the output clock circuit 7 (also known collectively as a genlock circuit) and if the external reference is not present a selected one of the plurality of input video signals, in the present example shown as the video 1 signal, is used.

A common output clock section 7 is shown to be utilized with the plurality of video signal paths. The clock and timing signals from 7 are coupled via individual adjustment controls to individual signal paths. The individual adjustments of 7 correspond to the H & V phase, and 14 to fine video phase adjustments of FIG. 1 of the parent application. These adjustments allow these parameters of each video output to be individually adjusted.

In the preferred embodiment, section 2 operates to detect when the input signal is disrupted, which may be performed by detecting when sync like pulses from the video are missing or misplaced, or when the input PLL is consequently unlocked. The information of the input being disrupted is used by the memory controller 6 to cause the memory 5 to cease storage of video samples and repetitively output an entire repetition period of stored samples of the previously input video during at least the pendency of the disruption. This action results in a frozen image being output from memory. Alternatively, the output processing section may be caused to output a known image, such as black for example, or to select another video signal. The output processing section may select the known image or other video after a time delay. For example after 5 seconds of frozen image the output processing section may fade to a message to standby. In addition, the output processing section may also operate to interact with the auxiliary signal as previously described.

While it is preferred to have only one output clock circuit 7, one skilled in the art will recognize from the present teachings that it is also possible to have more than one such circuit, thus allowing synchronization to a plurality of references. For example, 3 inputs might be synchronized to one reference and a different 3 inputs to another. Many other combinations are possible as well and one of ordinary skill in the art will know to adapt the circuitry of the present teachings to fit a particular need for the invention.

As shown with respect to the DDO (delay detector output) signal from memory control 6 in the diagram of FIG. 1, it will be appreciated from the teachings of the earlier application that the memory control 6 operates to output a delay signal which is representative of the delay which the signal undergoes in the memory. In the present example this delay is the same for both the AUX and Video 1 signal, however it may represent either delay. Such delay signal may be utilized to delay an associated signal by an amount to keep it properly timed with the signal whose delay through 5 it represents. For example it may be utilized to control the delay of an associated audio signal to match the delay of the Video 1 signal. In addition, it will also be appreciated that the memory 5 itself is shown to be configured to include appropriate circuitry to delay the associated AUX signal by an amount to keep it properly timed with the video signal.

Figure 2:
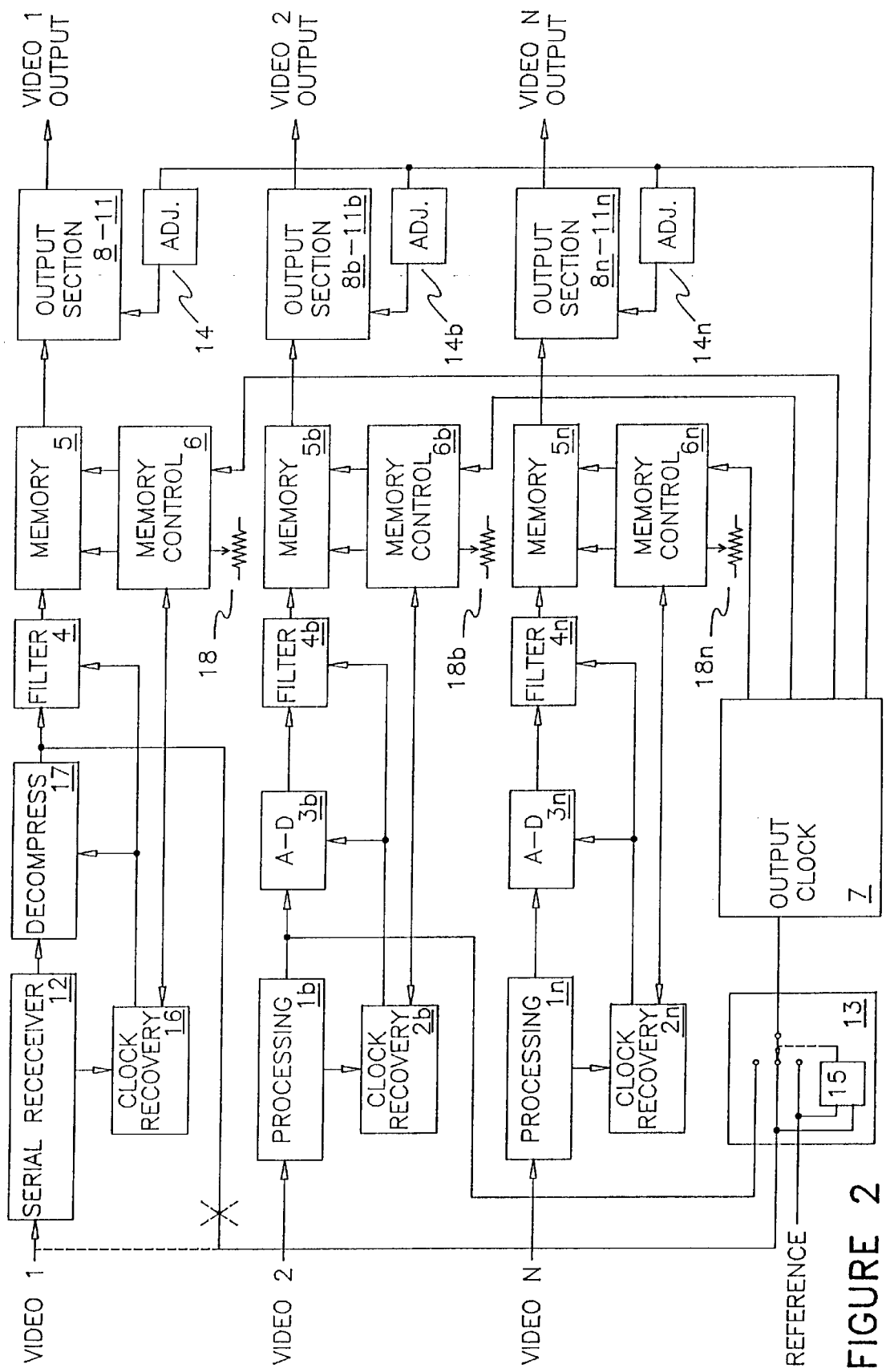
FIG. 2 is a block diagram of a multiple synchronizer system of the preferred embodiment of the invention as used with both analog and digital video signals.

FIG. 2 shows the preferred embodiment of the invention as used with digital signals. The embodiment of the invention shown in FIG. 2 is similar to that of FIG. 1, except that the first video input is shown as a digital input, and as with the earlier device of FIG. 1, the stored video read out of the memory 5 is coupled to the output section 8–11 where the video is operated on as previously described to pass, alter or reconstruct or reconstitute select portions contained within the non picture areas. For example, the embedded digital audio may passed unaltered while the active video may be operated on to change the gain or offset of one or more of the luma or chroma components, and the error checking and correcting signals recalculated and the SAV and EAV signals reconstituted.

FIG. 2 also shows individual timing controls 18 configured to allow the memory control 6 to provide adjustable timing of the output video signal with respect to the reference input signal selected by 13. This location of the adjustment is different than that of FIG. 1 in which the adjustment is provided as part of 7.

The reference selector 13 is seen to select one of the preferred reference, video 1 or video 2 in accordance with a hierarchy or other criteria or plan of selections which may be specified at the time of manufacture or by an operator as previously discussed. It is seen that 15 is responsive to the preferred reference and to video 1 to select one of the three aforementioned signals as the reference to be coupled to 7. It may also be seen in FIG. 2 that the video 1 signal which is utilized for reference may be taken before or after the serial receiver and decompression as appropriate, as shown by the dashed line connection. Similarly, the Video 2 or other signal may be utilized before of after processing and/or decompression as will be apparent to one of ordinary skill in the art from the teachings herein.

FIG. 2 shows elements 1–11 as in FIG. 1. In addition a serial digital receiver 12 is shown to receive the serial digital video 1 signal. Receiver 12 is coupled to a clock recovery circuit 16 to recover the clock and synchronizing components from the serial video, which clock and synchronizing components are used as are those of element 2. In addition a decompress circuit is shown to provide for decompression of compressed video signals.

The serial receiver 12 and clock recovery circuitry are responsive to the serial digital video signal to recover the clock and synchronizing portions therefrom. Other types of digital signals may be accommodated as well and 12 and 16 will be understood to respond to such digital signals which also often contain synchronizing components such as start of active video (SAV), end of active video (EAV) which have different names and positions, and in some instances different functions, with respect to their analog counterparts, but which still are provided for the purpose of identifying portions or segments of the data stream.

Serial receiver 12 may also operate to receive embedded associated signals such as digital audio, time stamps, etc. for the uses previously described.

For the purposes of the present disclosure and claims the words synchronizing, synchronizing components, synchronizing portions and the like will be understood to apply to those portions of the signal which are utilized for such control and/or identification functions. When speaking of the purpose or use such synchronizing related words, it will be understood to mean the intended usage as commonly known in the art as will be understood by one of ordinary skill in the art, even though the wording herein may differ from the commonly used wording.

As an example, when it is stated "synchronizing components define horizontal lines of active video" the phrase "synchronizing components" is intended to include the digital SAV and EAV values which define the start and end of active video for SMPTE 259 video, as well as other similar digital components, even though "synchronizing components" is more commonly used in the analog sense of sync pulses which drive the line oscillator in a TV receiver. The use of the word signal will also be understood to include an individual component and vice versa, for example an associated signal may include a timing component or an auxiliary component of a digital video data stream. It will nevertheless be understood that the phrases used herein are intended to apply equally to analog signals and digital data streams in analog component, composite, serial and parallel; digital serial, parallel, component, composite, compressed and other forms and standards of electronic signal conveyance.

Although this invention has been described in its referred form with a certain degree of particularity, it is understood that the present disclosure of the preferred form has been made only by way of example and that numerous changes in the details of construction and the combination, arrangement and sharing of parts may be resorted to, as well as combination, arrangement and sharing of parts and elements with other functions or features, without departing from the spirit and the scope of the invention as hereinafter claimed.

What is claimed is:

1. The method of converting an analog video signal to digital including the steps of:
   a) processing said analog video signal to identify at least one sync component thereof and to provide a known DC level signal which is a version of said analog video signal;
   b) generating an ADC clock and a pixel clock, both of which are phase locked to said sync component of a);
   c) sampling said known DC level signal of a) in an ADC in response to said ADC clock thereby providing a first digital version of said analog video signal having a first known number of digital samples for each line of the picture area of said analog video signal;
   d) filtering said first known number of digital samples to provide a smaller second known number of digital samples having improved resolution as compared to said first known number;
   e) further filtering said second known number of digital samples to provide a second digital version of said analog video signal.

2. The method as claimed in claim 1 wherein said second known number is one half of said first known number.

3. The method as claimed in claim 1 including the further step of:
   f) recovering at least one auxiliary signal carried in a non picture area of said analog video signal.

4. The method as claimed in claim 3 wherein said auxiliary signal is recovered from said first digital version of said analog video signal.

5. The method as claimed in claim 3 wherein said auxiliary signal is recovered from said second digital version of said analog video signal.

6. The method as claimed in claim 3 wherein said auxiliary signal is muted, modified or acted on when said analog video signal is disrupted.

7. The invention as claimed in claim 1 wherein at least one of said analog video signal or said digital version of said analog video signal is operated on in delayed or undelayed form to change one or more components of an active video portion thereof while passing signals in a nonpicture area thereof unaltered by said change.

8. A method for delaying at least a first digital video signal and at least a first auxiliary signal in a fashion to maintain proper time relationship thereof, said first video signal and said first auxiliary signal being in analog or digital form and having a time relationship before said delaying, said method including the steps of:
   a) processing said first video signal to provide a first digital video signal;
   b) storing said first digital video signal via a first signal path,
   c) storing said first auxiliary signal via an additional signal path,
   d) recovering said first digital video signal from said first signal path thereby providing a recovered video signal which is a delayed version of said first video signal;
   e) recovering said first auxiliary signal from said additional signal path thereby providing a first recovered auxiliary signal which is a delayed version of said first auxiliary signal;
   f) performing said recovery of one of step d) or step e) relative to the other such that said time relationship of said first recovered auxiliary signal of step e) is maintained with respect to said recovered video signal of step d).

9. The method of claim 8 wherein said first video signal is an NTSC or PAL type video signal carrying images of a scene and said first auxiliary signal is an associated audio signal carrying sounds which correspond to actions in said scene.

10. The method of claim 9 wherein step f) operates such that the time relationship of an action conveyed by said first video signal and a corresponding sound conveyed by said first auxiliary signal is substantially maintained as said action and said corresponding sound are conveyed by said recovered video signal and said first recovered auxiliary signal.

11. The method of claim 8 wherein said first video signal is an NTSC or PAL type video signal carrying images and said auxiliary signal represents text having a time relationship to said images.

12. The method of claim 11 wherein when a given text message is present as represented by said first auxiliary signal in association with one or more given frames of said first video signal, step f) operates such that when said one or more given frames is present in said recovered video signal said given text message is available in said first recovered auxiliary signal.

13. The method of claim 8 wherein said auxiliary signal represents data.

14. A method of processing at least a first video signal in analog or digital form and further processing at least first and second auxiliary signals in analog or digital form, said first auxiliary signal having a time relationship with said first video signal before said processing, said method including the steps of:
   a) compressing said first video signal to provide a first compressed video signal in digital form;
   b) putting said first compressed video signal into a first video path;
   c) putting, in digital form, said first and said second auxiliary signals respectively into first and second auxiliary paths;
   d) taking said first compressed video signal from said first video path;
   e) converting said first compressed video signal of step d) to a first recovered video signal;
   f) taking said first auxiliary signal from said first auxiliary path to provide a first recovered auxiliary signal;
   g) performing step f) and step d) such that said time relationship is maintained between said first recovered auxiliary signal with respect to said first recovered video signal.

15. The method of claim 14 wherein said first video signal carries images of a television scene and said first auxiliary signal is an audio signal carrying sounds of said television scene.

16. The method of claim 15 wherein step g) operates such that the time relationship of said recovered auxiliary signal relative to said recovered video signal is such that an action occurring in said television scene and its accompanying sound are essentially synchronous as conveyed by said first recovered auxiliary signal and said first recovered video signal.

17. The method of claim 14 wherein said second auxiliary signal represents text.

18. The method of claim 17 wherein a given text message is present as represented by said second auxiliary signal in association with a given segment of said first video signal and step f) operates such that when said given segment is present in said first recovered video signal said given text message is present in a recovered version of said second auxiliary signal.

19. The method of claim 14 including processing a second video signal which is unsynchronized with respect to said first video signal, said first and said second video signals each carrying images of respective scenes, and said first auxiliary signal is an audio signal which carries sounds corresponding to the images carried by said first video signal, and wherein a given text message is present as represented by said second auxiliary signal in association with a given frame of said first video signal said method further including:
   step h) compressing said second video signal to provide a second compressed video signal;
   step i) putting said second compressed video signal into a second video path;
   step j) taking said second compressed video signal from said second video path;
   step k) converting said second compressed video signal to a second recovered video signal;
   step l) performing the taking said second compressed video signal such that said second recovered video signal has a synchronous relationship with said first recovered video signal;
   step m) taking said second auxiliary signal from said second auxiliary path to provide a second recovered auxiliary signal in a manner such that the time relationship of said second recovered auxiliary signal is preserved relative to said first recovered video signal is preserved.

20. The method of claim 14 wherein said first video signal is derived from a television camera which televises a scene and said second auxiliary signal represents data having a relationship to activities in said scene.

21. The method as claimed in claim 14, 15, 16, 17, 18 or 20 including processing a second video signal to provide a second recovered video signal having a synchronous relationship with said first recovered video signal.

22. The method as claimed in claim 8, 9, 10, 11, 12, 13, 14, 15, 16, 17, 18, 19 or 20 wherein said first recovered video signal has a synchronous relationship with said first video signal.

23. The method of upholding the relative timing relationship of a video signal in analog form, one or more audio signals in analog form and one or more digital data signals when said signals are stored in digital memory, including the steps of:
   a) processing said video signal to provide a processed video signal version thereof which is in digital form;
   b) processing each said audio signal to respectively provide a processed audio signal version thereof each of which is in digital form;
   c) processing each said digital data signal to respectively provide a processed data signal;
   d) storing said processed video signal in a video memory;
   e) storing each said processed audio signal in an audio memory;
   f) storing each said processed data signal in a data memory;
   g) recovering said processed video signal from said video memory of step d);
   h) recovering said processed audio signal from said audio memory of step e);
   i) recovering said processed data signal from said data memory of step f);
   j) performing said recovery of one of step g) or step h) relative to the other such that said relative timing relationship is upheld.

24. The method as claimed in claim 23 wherein said recovery of one of step g) or step i) is performed relative to the other such that said relative timing relationship is maintained.

25. The method as claimed in claim 23 or 24 wherein said video signal of step a) is responsive to a television camera televising a scene, there is at least one said audio signal of step b) carrying sound of said scene.

26. The method as claimed in claim 23 or 24 wherein said video signal of step a) is responsive to a television camera televising a scene, there is at least one said audio signal of step b) carrying sound of said scene and at least one said digital data signal of step c) carrying text related to said scene.

27. The method as claimed in claim 23 or 24 wherein said video signal of step a) is responsive to a television camera televising a scene, there is at least one said audio signal of step b) carrying sound of said scene and at least one said digital data signal of step c) carrying data related to said scene.

28. The method as claimed in claim 23 or 24 wherein said video signal of step a) is responsive to a television camera televising a scene, there is at least one said audio signal of step b) carrying sound of said scene and at least one said data signal of step c) carrying messages related to said scene.

29. An apparatus for storing and preserving the relative timing relationship of an analog video signal, one or more associated analog audio signals and one or more digital data signals including in combination:
   a) a video processing circuit responsive to said analog video signal to provide a processed video signal which is in digital form;
   b) an audio processing circuit responsive to each said analog audio signal to respectively provide a processed audio signal each of which is in digital form;
   c) a data processing circuit responsive to each said digital data signal to respectively provide a processed data signal;
   d) a video storing circuit operative to store said processed video signal in a digital video memory;
   e) an audio storing circuit operative to store each said processed audio signal in a digital audio memory;
   f) a data storing circuit operative to store each said processed data signal in digital data memory;
   g) a video recovering circuit operative to recover said processed video signal from said digital video memory and provide a recovered video signal;
   h) an audio recovering circuit operative to recover said processed audio signal from said audio memory and provide a recovered audio signal;
   i) a data recovering circuit operative to recover said processed data signal from said digital data memory and provide a recovered data signal;
   j) said circuits of step g) and step h) operating one in response to the other such that said relative timing relationship is maintained with respect to said recovered video signal and said recovered audio signal.

30. The apparatus as claimed in claim 29 wherein said recovery performed by one of circuit g) or circuit i) is performed relative to the other such that said relative timing relationship is maintained.

31. The apparatus as claimed in claim 29 or 30 wherein said analog video signal of circuit a) is responsive to a television camera televising a scene and there is one said analog audio signal of step b) carrying sound of said scene.

32. The apparatus as claimed in claim 29 or 30 wherein said analog video signal of circuit a) is responsive to a television camera televising a scene, there is one said analog audio signal of circuit b) which carries sound of said scene and one said digital data signal of circuit c) which carries text related to said scene.

33. The apparatus as claimed in claim 29 or 30 wherein said analog video signal of circuit a) is responsive to a television camera televising a scene, there is at least one said analog audio signal of circuit b) carrying sound of said scene and at least one said digital data signal of circuit c) carrying data related to said scene.

34. The method as claimed in claim 29 or 30 wherein said analog video signal of circuit a) is responsive to a television camera televising a scene, there is at least one said analog audio signal of circuit b) carrying sound of said scene and at least one said digital data signal of circuit c) carrying message as related to said scene.

35. A method as claimed in claim 8 wherein in step b) said first digital video signal is stored in compressed form.

36. A method as claimed in claim 8 wherein in step c) said first auxiliary signal is stored in compressed form.

37. A method as claimed in claim 8 wherein in step b) said first digital video signal is stored in compressed form and in step c) said first auxiliary signal is stored in compressed form.

38. A method as claimed in claims 8, 35, 36 or 37 wherein said additional signal path of step c) share common elements with said first signal path of step b).

39. A method as claimed in claim 14 wherein in step c) said first auxiliary signal is stored in compressed form.

40. A method as claimed in claim 14 wherein in step c) said second auxiliary signal is stored in compressed form.

41. A method as claimed in claim 14 wherein in step c) said first auxiliary signal is stored in compressed form and said second auxiliary signal is stored in compressed form.

42. A method as claimed in claims 14, 34, 40 or 41 wherein said first or said second auxiliary paths of step c) share common elements with said first signal path of step b).

43. A method as claimed in claims 14, 34, 40 or 41 wherein said first and said second auxiliary paths of step c) share common elements with said first signal path of step b).

44. A method as claimed in claims 19 wherein portions of said second video path of step i) are shared with said first video path.

45. A method as claimed in claim 23 in which in step a) said processed video signal is in compressed form.

46. A method as claimed in claim 23 in which in step b) one or more of said processed audio signal is in compressed form.

47. A method as claimed in claim 23 in which in step c) one or more of said processed data signal is in compressed form.

48. A method as claimed in claim 23 in which in step e) said audio memory shares elements with said video memory of step d).

49. A method as claimed in claim 23 in which in step f) said data memory shares elements with said video memory of step d).

50. A method as claimed in claim 23 further including:
    in step a) said processed video signal is in compressed form;
    in step b) at least one of said processed audio signal is in compressed form;
    in step c) at least one of said processed data signal is in compressed form.

51. A method as claimed in claim 23 further including:
    in step e) said audio memory shares elements with said video memory of step d);
    in step f) said data memory shares elements with said video memory of step d).

52. A method as claimed in claim 23 further including:
    in step a) said processed video signal is in compressed form;
    in step b) at least one of said processed audio signal is in compressed form;
    in step c) at least one of said processed data signal is in compressed form;
    in step e) said audio memory shares elements with said video memory of step d);
    in step f) said data memory shares elements with said video memory of step d).

53. An apparatus as claimed in claim 29 wherein said processed video signal of a) is compressed.

54. An apparatus as claimed in claim 29 wherein said processed audio signal of b) is compressed.

55. An apparatus as claimed in claim 29 wherein said processed data signal of c) is compressed.

56. An apparatus as claimed in claim 29 wherein said digital audio memory of e) shares portions with said digital video memory of d).

57. An apparatus as claimed in claim 29 wherein said digital data memory of f) shares portions with said digital video memory of d).

58. An apparatus as claimed in claim 29 wherein said processed video signal of a) is compressed, said processed audio signal of b) is compressed and said processed data signal of c) is compressed.

59. An apparatus as claimed in claim 29 wherein said digital audio memory of e) shares portions of said digital video memory of d) and said digital data memory of f) shares portions of said digital video memory of d).

60. The method of upholding the relative timing relationship of a video signal, at least one audio signal and at least one digital data signal when said signals are passed in digital form through a digital data path which includes a digital memory, said method including the steps of:
    a) processing said video signal, said audio signal and said digital data signal to provide a corresponding processed signal for each;
    b) storing said processed signals of step a) in said digital memory;
    c) recovering said processed signals stored in step b) from said digital memory;
    d) reconverting each of said processed signals recovered in step c) back to a corresponding video, audio or digital data signal;
    e) performing said recovery of one or more of said processed signals of step c) relative to the other such that the relative timing of at least two said corresponding video, audio or digital data signals of step d) is maintained.

61. A method of using a memory for storing a video type signal and having a parallel storage path useful in television systems for the passing of at least one related or unrelated secondary signal with said video type signal in order to maintain the time relation therebetween, said method including:
    a) receiving and processing said secondary signal to provide a processed secondary signal;
    b) receiving and processing said video type signal to provide a processed video signal;
    c) storing said processed secondary signal in a portion of a digital memory;
    d) storing said processed video signal in a separate portion of said digital memory of c);
    e) at a time after step c), recovering said processed secondary signal from said digital memory;
    f) at a time after step d), recovering said processed video signal from said digital memory;
    g) performing at least one of step e) and step f) such that said time relation is maintained;
    h) converting said recovered processed secondary signal of step e) to the same form as said secondary signal of step a);
    i) converting said recovered processed video signal of step f) to the same form as said video signal of step b).

62. A method as claimed in claim 61 wherein steps b), d), f) and i) comprise a path for storage of said video type signal; steps a), c), e) and h) comprise a separate but parallel path for the storage of said secondary signal, and step g) ensures that said time relationship between said video type signal and said secondary signal is maintained as each is stored via its relative path.

63. A method as claimed in claim 61 or 62 wherein said secondary signal of step a) represents text.

64. A method as claimed in claim 61 or 62 wherein said secondary signal of step a) represents messages.

65. A method as claimed in claim 61 or 62 wherein said secondary signal of step a) represents data.

66. A method as claimed in claim 61 or 62 wherein said secondary signal of step a) represents audio.

* * * * *